US010770201B2

(12) United States Patent
Perego et al.

(10) Patent No.: US 10,770,201 B2
(45) Date of Patent: Sep. 8, 2020

(54) METHOD OF MANUFACTURING POWER CABLES AND RELATED POWER CABLE

(71) Applicant: PRYSMIAN S.P.A., Milan (IT)

(72) Inventors: Gabriele Perego, Milan (IT); Paolo Liboi, Milan (IT)

(73) Assignee: PRYSMIAN S.p.A., Milan (IT)

(*) Notice: Subject to any disclaimer, the term of this patent is extended or adjusted under 35 U.S.C. 154(b) by 586 days.

(21) Appl. No.: 14/899,898

(22) PCT Filed: Jun. 27, 2013

(86) PCT No.: PCT/EP2013/063558
§ 371 (c)(1),
(2) Date: Dec. 18, 2015

(87) PCT Pub. No.: WO2014/206474
PCT Pub. Date: Dec. 31, 2014

(65) Prior Publication Data
US 2016/0141076 A1 May 19, 2016

(51) Int. Cl.
*H01B 7/02* (2006.01)
*H01B 7/282* (2006.01)
(Continued)

(52) U.S. Cl.
CPC ............ *H01B 7/2825* (2013.01); *C23C 4/06* (2013.01); *H01B 1/02* (2013.01); *H01B 7/14* (2013.01);
(Continued)

(58) Field of Classification Search
CPC .......... H01B 1/02; H01B 7/02; H01B 7/2825; H01B 7/14; H01B 7/045
(Continued)

(56) References Cited

U.S. PATENT DOCUMENTS 2,697,769 A * 12/1954 Carpenter .......... H01B 13/2633
174/102 R
2,936,357 A * 5/1960 Crawford ............... B23K 13/02
156/54
(Continued)

FOREIGN PATENT DOCUMENTS

DE 33 12 551 10/1984

OTHER PUBLICATIONS

International Search Report from the European Patent Office for International Application No. PCT/EP2013/063558, dated Feb. 17, 2014.
(Continued)

*Primary Examiner* — William H. Mayo, III
(74) *Attorney, Agent, or Firm* — Finnegan, Henderson, Farabow, Garrett & Dunner, L.L.P.

(57) ABSTRACT

A method for manufacturing an electrical cable includes providing at least one core including an electrical conductor, and arranging at least one copper sheath around the at least one core. The arranging of the copper sheath includes providing at least one foil of copper having two opposite first edges; bending the foil of copper around the core until the first edges of the foil of copper are contacted with each other; welding the first edges of the foil of copper to each other to form a corresponding solder jointwelded joint; and deposing a copper coating on at least portions of the surface of the foil of copper at the welded joint. The deposing the copper coating is carried out by means of a thermal spray process.

12 Claims, 4 Drawing Sheets

(51) Int. Cl.
  *H01B 13/26* (2006.01)
  *C23C 4/06* (2016.01)
  *H01B 1/02* (2006.01)
  *H01B 7/14* (2006.01)
  *H01B 9/00* (2006.01)
  *H01B 7/04* (2006.01)

(52) U.S. Cl.
  CPC ......... *H01B 9/006* (2013.01); *H01B 13/2613* (2013.01); *H01B 13/2693* (2013.01); *H01B 7/045* (2013.01); *Y02A 30/14* (2018.01)

(58) Field of Classification Search
  USPC ...................................... 174/102 R, 103, 109
  See application file for complete search history.

(56) References Cited

U.S. PATENT DOCUMENTS

| | | | | |
|---|---|---|---|---|
| 3,226,522 A * | 12/1965 | Duddridge | .............. | B21C 37/08 219/60 R |
| 3,394,450 A * | 7/1968 | Gill | .............. | B21C 37/09 29/430 |
| 4,145,567 A * | 3/1979 | Bahder | .............. | H01B 7/2825 156/56 |
| 4,191,319 A * | 3/1980 | Headrick | .............. | B21C 37/0807 228/147 |
| 4,385,203 A * | 5/1983 | Faranetta | .............. | H01B 7/28 156/53 |
| 5,527,995 A * | 6/1996 | Lasky | .............. | H01B 9/022 174/102 D |
| 2003/0196732 A1 * | 10/2003 | Carey, II | .............. | B32B 15/01 148/537 |
| 2004/0060726 A1 * | 4/2004 | Orlet | .............. | H01B 7/046 174/120 R |
| 2009/0068495 A1 * | 3/2009 | Dembowski | .............. | B23K 31/02 428/684 |
| 2010/0044068 A1 * | 2/2010 | Deighton | .............. | H01B 7/0072 174/107 |
| 2010/0297464 A1 * | 11/2010 | Oishi | .............. | B23K 35/302 428/586 |
| 2014/0060884 A1 * | 3/2014 | Patel | .............. | H01B 7/2825 174/102 A |

OTHER PUBLICATIONS

Written Opinion of the International Searching Authority from the European Patent Office for International Application No. PCT/EP2013/063558, dated Feb. 17, 2014.

Spring/Fall 2009 C11-Minutes of Insulated Conductors Committee (see http:/www.pesicc.org/iccwebsite/subcommittees/subcom_c/C11/C11Minutes2009.htm), 3 pages. (2009).

* cited by examiner

METHOD OF MANUFACTURING POWER CABLES AND RELATED POWER CABLE

CROSS REFERENCE TO RELATED APPLICATION

This application is a national phase application based on PCT/EP2013/063558, filed Jun. 27, 2013, the content of which is incorporated herein by reference.

BACKGROUND OF THE INVENTION

Field of the Invention

The present invention generally relates to the field of power cables for electric power transmission and distribution, in particular to cables for underwater or underground use.

Description of the Related Art

Power cables for power transmission in the Medium Voltage (MV) and High Voltage (HV) ranges (from 1 kV to 35 kV for MV and higher than 35 kV for HV) typically comprise one or more conductors (one conductor for single-phase power transmission, three conductors for 3-phase power transmission; cables with more than one conductor are also referred to as "multi-core" cables). Each conductor is usually surrounded by an inner semiconducting layer, an insulation layer and an outer semiconducting layer, the conductor and said layers being hereinafter referred to as "core". An armor, for example of metal wires or metal tapes, can be provided to surround the core/s, especially in case of underwater cables, for providing resistance to tensile stress. In some applications, the armor may be covered by a polymeric sheath.

When a power cable of the abovementioned type has to be installed in a wet or potentially wet environment, such as underwater or underground, its core/s should be protected from water penetration that may lead to electrical breakdown. For this purpose, the cable is equipped with a water barrier, which can be provided around each core or around the bundle of cores, for preventing or at least reducing the occurrences of water trees possibly producing electrical breakdown.

Different types of water barrier are known. In particular for underwater or underground cables the material at present more frequently used for implementing water barrier is lead, especially for HV submarine cables. Lead has proved to be a reliable and sturdy sheathing material for implementing barrier capable of efficiently preventing the water ingress. However, barrier made of lead are affected by some drawbacks. First of all, water barrier made of lead are quite heavy, and this increases the production, transport, storage and deployment costs of the cable. Moreover, ecological concerns are inducing to dismiss the use of lead, because of its environmental toxicity.

Water barrier made of welded copper have been proposed, as disclosed, for example, in the spring/fall 2009 C11-Minutes of Insulated Conductors Committee (see http://www.pesicc.org/iccwebsite/subcommittees/subcom_c/C11/C11 Minutes2009.htm) and in "HVAC Power Transmission to the Gjøa Platform" by E. Eriksson et al., 8th International Conference on Insulated Power Cables, A.6.5, Jicable' 11-19-23 Jun. 2011, Versailles—France. In particular, cables are said to be provided with welded corrugated copper sheath as a protection against radial moisture penetration.

A copper sheath is considered to be very resistant against fatigue phenomena, which can demolish a lead sheath after a large number of bends. For this reason, a copper sheath can be used for underwater dynamic power cables, which are suspended freely from floating oil and gas platforms and are subject to repeated bends due to waves.

According to known solutions, water barriers made of welded copper are manufactured by wrapping a copper foil around the cable and then welding together the edges of the wrapped copper foil along the cable length.

SUMMARY OF THE INVENTION

The Applicant has found that the solutions known in the art are not fully effective.

Water barrier obtained by welding the edges of a copper foil wrapped around the cable are not fully reliable, in particular for underwater application, since microscopic defects, such as micro-holes and micro-cracks, may occur along the welded joint connecting the edges of the wrapped foil. Passing through such microscopic defects, moisture may reach the inner layers of the cable down to the insulation layer and may represent a risk of degradation for the performance of the cable and/or of reduction of the operating life thereof. Therefore, in order to prevent the infiltration of moisture, the cable water barrier should be subjected to an expensive and time consuming weld quality check procedure directed to identify and locate the defects. Then, once such microscopic defects are identified and located, the water barrier is cut to remove the portions thereof wherein such defects are located and substituted with "patch" brazed upon the edges of the cut sheath. This operation is to be carried out by highly qualified technicians and the brazed patch remains a weak point of the cable.

The Applicant has faced the problem of improving the reliability of the weld of a copper water barrier against moisture infiltrations even in harsh environment, for example underwater where considerable pressure is exerted on the cable.

The Applicant found that the application of a thin copper layer by thermal spraying coating can amend the possible defects of a copper welded sheath so efficiently to make the sheath capable of performing as cable water barrier even in the presence of significant external pressure.

An aspect of the present invention provides for a method for manufacturing a power cable which comprises providing at least one core comprising an electrical conductor, and arranging at least one copper sheath around the at least one core, providing at least one copper foil having two opposite first edges; bending the copper foil around the core until the first edges are contacted to each other; welding the first edges to each other to form a corresponding welded joint; and deposing a copper coating on the surface of the copper foil at the welded joint wherein deposing the copper coating is carried out by a thermal spray process. Steps of providing around the core/s layers and structures for obtaining the power cable suitably follow.

The step of welding the edges to each other to form a corresponding welded joint can be performed by overlapping the copper foil edges or by butt-welding. The butt-welding is preferred, especially when the cable is for underwater application. In particular the butt-welding is advantageously performed by joining substantially parallel and coplanar edges cut right before welding to exclude impurities, in particular metal oxide, on the surface to be joined. In fact, the presence of oxide could impair the welding strength.

A thermal spray process suitable for the method of the present invention is preferably selected from flame spray, in particular flame powder spray and High-Velocity Oxyfuel (HVOF) spray, and cold spray processes. HVOF spray and cold spray are particularly preferred.

In the case the thermal spray process is a flame spray process, the method of the invention advantageously further comprises, after the phase of welding and before the phase of deposing, roughening the surface of the copper foil at the welded joint location.

Preferably said phase of roughening comprises propelling a stream of abrasive material against the surface of the copper foil at the welded joint location.

The cable of the invention can be a multi-core cable including a plurality of cores. In this case the step of arranging the copper sheath around a core can comprise either arranging a respective copper sheath around each core of the plurality or arranging a copper sheath around a bundle of cores, or both. Preferably a copper sheath is provided around each core of the cable.

Preferably, the deposing step of the method of the invention provides a copper coating having a thickness of from 100 μm to 500 μm, more preferably of from 150 μm to 300 μm.

Another aspect of the present invention provides for a power cable comprising at least one core and one copper sheath surrounding the at least one core, in which the copper sheath has a welded joint covered by a thermal sprayed copper coating.

The cable according to the invention can be an underwater or an underground cable.

The copper foil and the resulting copper sheath can be either corrugated or flat. In the case of corrugated copper foil and sheath, the corrugation can be either parallel or perpendicular to the longitudinal axis of the cable. The selection between corrugated of flat sheath and, if corrugated, the corrugation direction is generally based on the cable laying and performance.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1A:
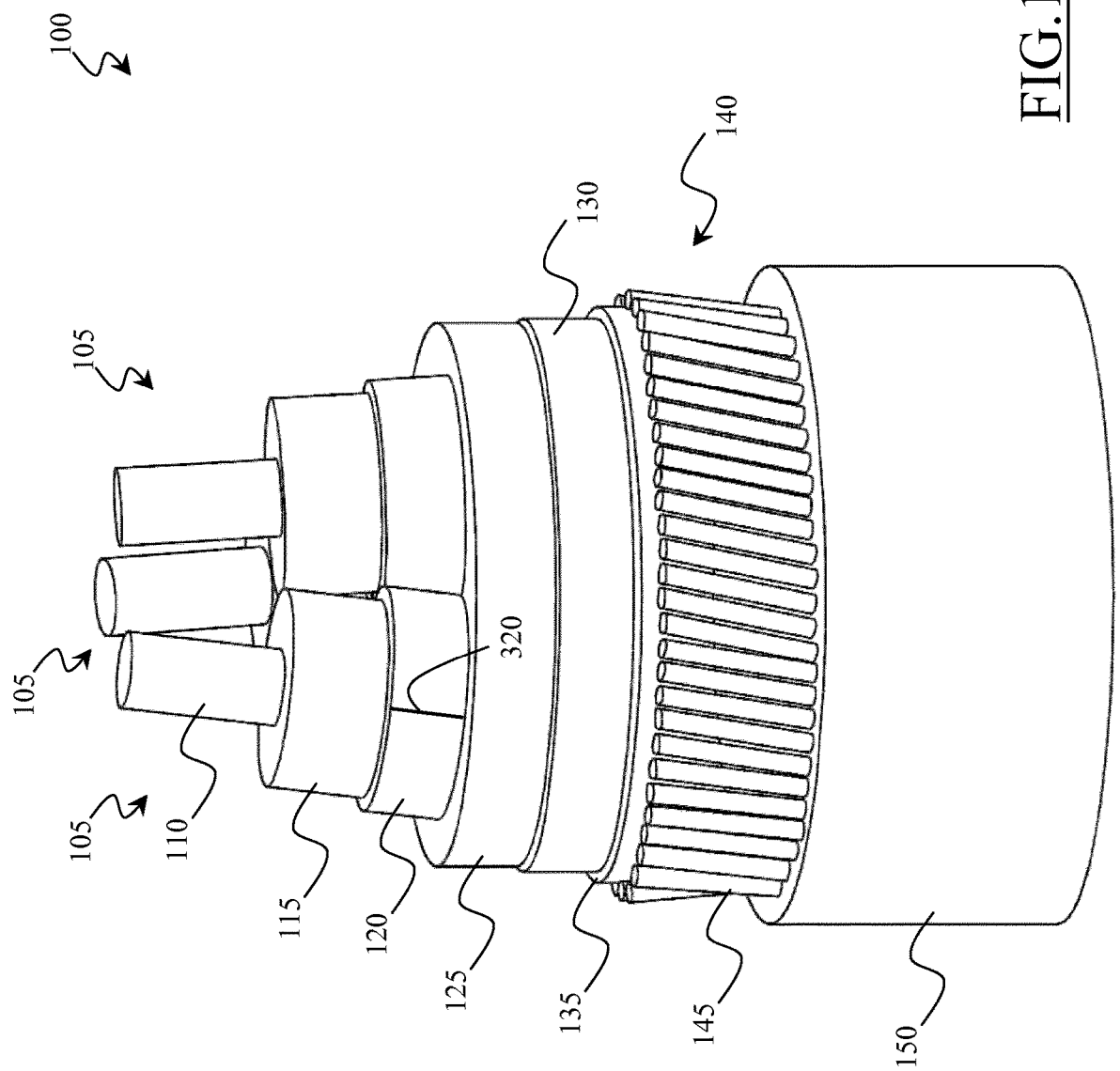
FIG. 1A is a three-dimensional view with partially removed portions of a power cable.
Figure 1B:
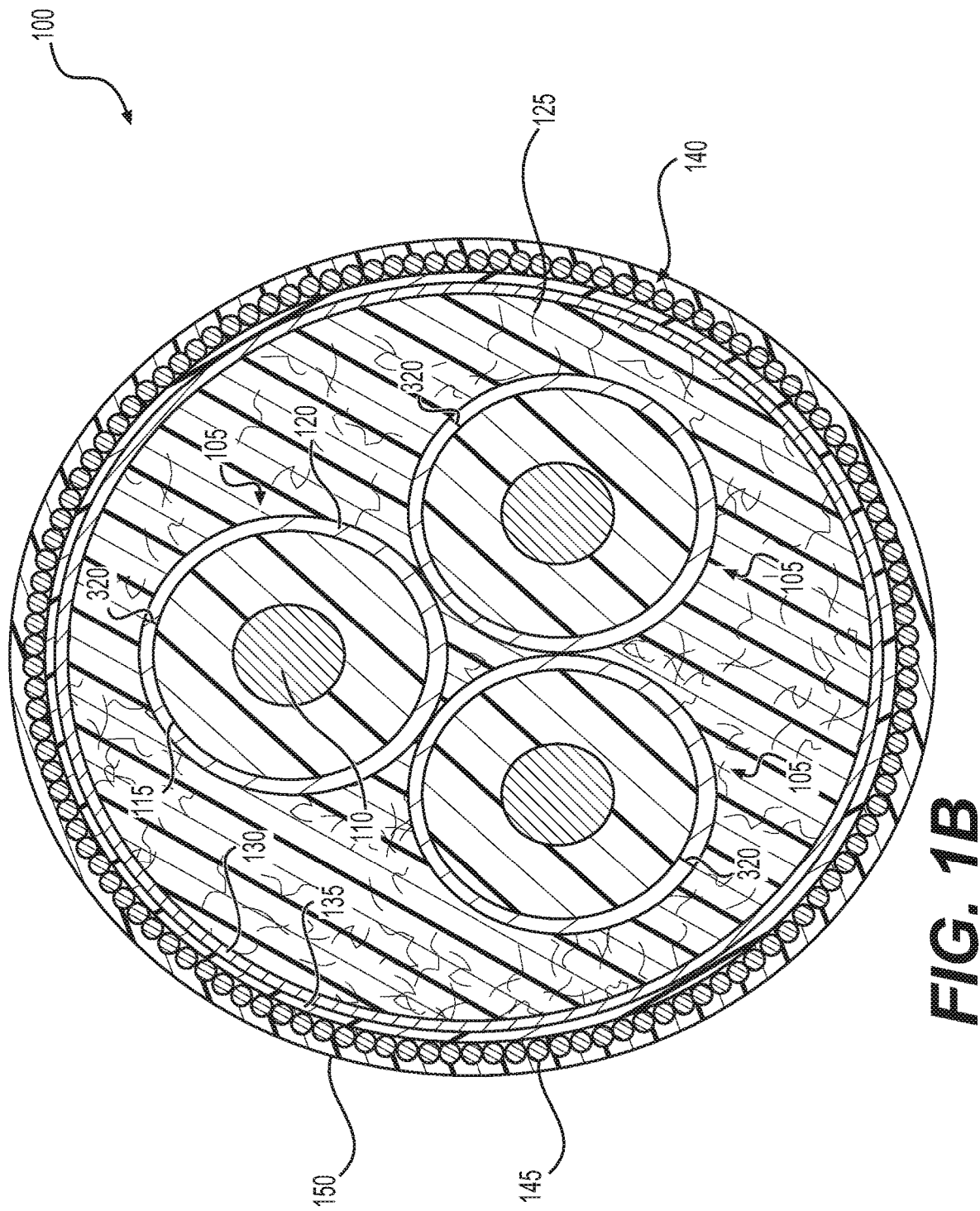
FIG. 1B is a cross-sectional view of the power cable of FIG. 1A.

With reference to the drawings, FIG. 1A is a three-dimensional view with partially removed portions of an electrical cable 100, particularly an underwater cable for power transmission in the MV or HV ranges. FIG. 1B is a cross-sectional view of the electrical cable 100 of FIG. 1A.

The cable 100 comprises three cores 105 helically stranded together. Each core 105 comprises an electrical conductor 110, i.e. a metal conductor typically made of copper, aluminum or both, in form of a rod or of stranded wires. The conductor 110 is sequentially surrounded by an inner semiconducting layer, an insulating layer 115 and an outer semiconducting layer around the insulating layer. In case of a submarine cable a water swellable layer is provided to surround the outer semiconducting layer, these three layers being collectively depicted and indicated as core layers 115. The insulating layer may be made of polymeric material (for example, polyethylene or polypropylene), wrapped paper or paper/polypropylene laminate. The semiconducting layers are typically made of a polymeric material, analogous to that employed for the insulating layer, charged with conductive filler such as carbon black. In the present embodiment, the three cores 105 are each surrounded by a corresponding water barrier 120 made of a copper sheath. A filler 125 surrounds the cores 105 and is surrounded, in turn, by a tape 130 and by a bedding layer 135. Around the bedding layer 135 an armor layer 140, for example comprising a single layer of steel wires 145 is provided. Preferably, the wires 145 are helically wound around the bedding layer 135. An external sheath 150, for example a polyethylene sheath, preferably covers the armor layer 140.

Figure 2:
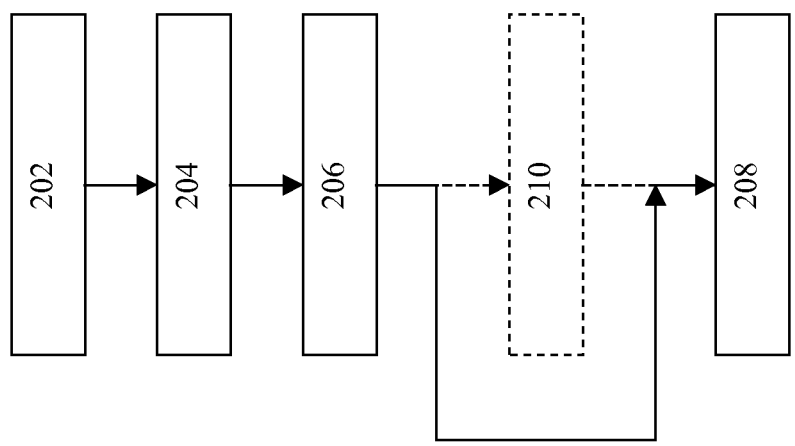
FIG. 2 is a flow chart depicting operations of a method for manufacturing a according to the present invention.

FIG. 2 is a flow chart depicting operations of a method 200 for manufacturing the cable 100, and particularly for manufacturing the water barrier 120 to be arranged around the cores 105 of the cable 100, according to an embodiment of the present invention.

The method 200 provides for fabricating the cores 105 of the cable 100 according to any one among the solutions known in the art, until assembling the core layers 115.

Figure 3A:
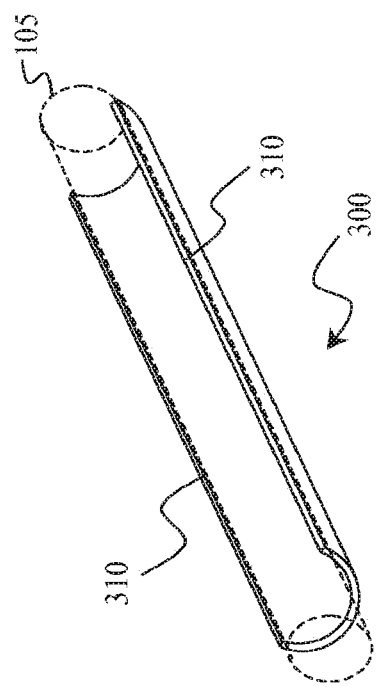
FIG. 3A-3D illustrates portions of a cable during phases of the method of FIG. 2.

The next phase 202 of the method 200, illustrated in FIG. 3A, comprises providing a copper foil 300, for example having a thickness of from 0.01 mm to 1 mm, and placing a core 105 on a main surface 305 of the foil 300. The copper foil 300 has a substantially rectangular shape, with two first opposite edges 310, substantially parallel to the longitudinal axis A of the core 105, and two second opposite edges 315 substantially perpendicular to the longitudinal axis A of the core 105.

Preferably, each second edge 315 has a length about 10 mm greater than the circumferential length of the core 105, so to leave a gap between the copper foil 300 once wrapped around the core 105 (see FIG. 3C), such gap avoiding the risk of heat-damaging the polymer layer underneath the foil 300 during the welding thereof.

In the case the welding is a butt-welding, each second edge 315 has a length of from 12 to 20 mm greater than the circumferential length of the core 105. From 2 to 8 mm of this length are cut-off just before the welding step to ensure the absence of impurities on the surfaces to be joined.

Each first edge 310 can have a length varying from case to case. For example, the first edge 310 can be up to 1500-3000 m long. When the length of the first edge 310 is shorter than that of the core 105, two or more copper foils 300 can be used and weld-joined at the respective second edge 315. Also such welds, transversal to the longitudinal axis A of the core 105, are advantageously spray treated according to the method of the invention.

Preferably, the core 105 is positioned substantially on the middle of the main surface 305 of the foil 300, with the longitudinal axis thereof parallel to the first edges 310.

Figure 3B:
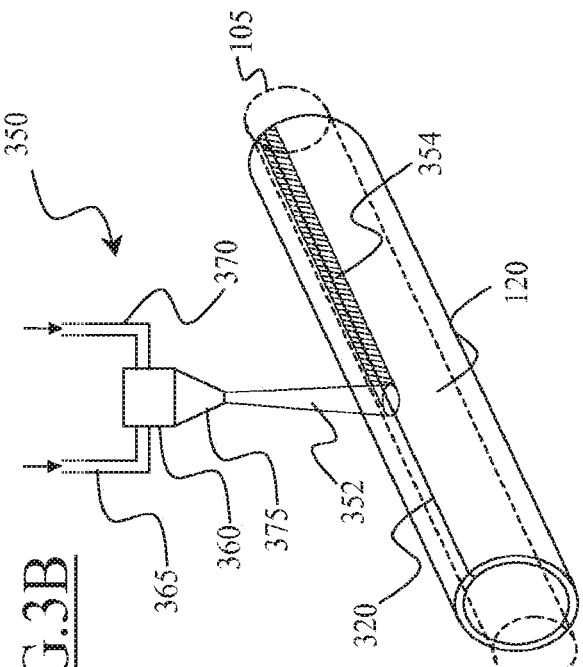
Figure 3C:
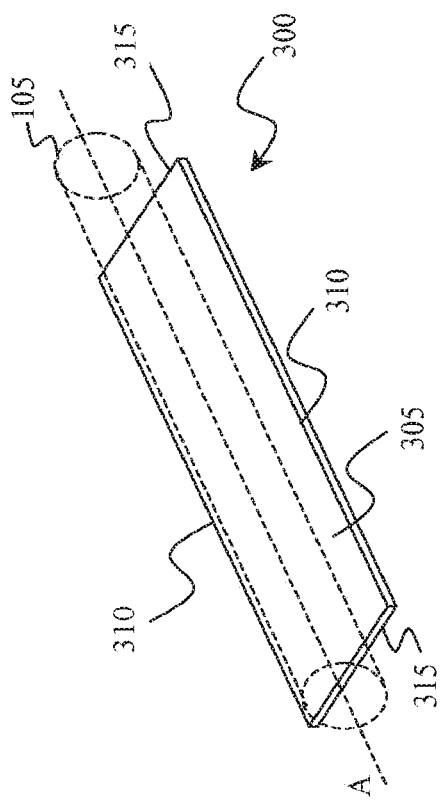

The phase 204 of the method 200, illustrated in FIG. 3B, provides for wrapping the copper foil 300 around the core 105 up to contact the first edges 310 one another so as the copper foil 300 envelopes the core 105, as from FIG. 3C, according to known technique.

In the next phase 206 of the method 200, the first edges 310 are welded to each other for example by a tungsten inert gas (TIG) welding technique. In this way, a water barrier 120 surrounding the core 105 is obtained. The water barrier 120 exhibits a welded joint 320 at the contacted first edges 310 extending parallel to the longitudinal axis of the core 105. Welded joints 320 are illustrated in water barrier 120 of cores 105 of the cable 100 in FIGS. 1A and 1B.

Microscopic defects may occur at the welded joint 320, through which moisture may disadvantageously reach the core layers 115.

After the phase 206, the method 200 according to an embodiment of the present invention provides for a deposition phase 208 directed to mend the abovementioned microscopic defects by deposing, through a thermal spray process, a copper coating substantially on the welded joint 320 of the water barrier 120.

As it is known to the skilled in the art (see, for example, "Introduction to Thermal Spray processing" and "Cold Spray Process", Handbook of Thermal Spray Technology, 2004 ASM International), the term "thermal spray" describes a family of processes that use thermal or kinetic energy to obtain and/or propel particles of metallic or non-metallic materials at high speeds (such as in the range of 50 to more than 1000 m/s) towards a surface to be coated (in this case, the barrier sheath surface at the welded joint). Different types of thermal spray processes may be employed to depose the copper coating on the surface of the water barrier 120 at the welded joint 320 during the copper coating deposition phase 208 according to various embodiments of the present invention.

For example, according to an embodiment of the present invention, the copper coating is deposed by means of a flame spray process such as a flame powder spray process, in which powdered copper is aspirated into a flame, melted, and carried by the flame and air jets towards the barrier sheath surface; or a High-Velocity Oxyfuel (HVOF) spray process, in which copper powder is injected in a hot gas jet generated by igniting and combusting continuously a mixture of gaseous or liquid fuel and oxygen, and the stream of hot gas and powder is directed toward the barrier sheath surface.

According to another embodiment of the present invention, the copper coating is deposed by a cold spray process, in which copper powder is accelerated to very high speeds using gas-dynamic techniques, for example with nitrogen or helium process gases.

Figure 3D:
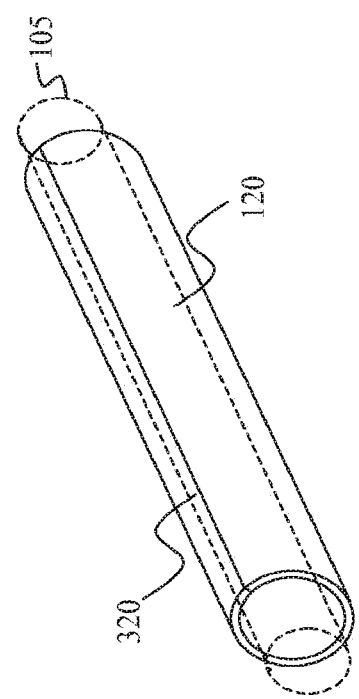

FIG. 3D is a sketched view of the water barrier 120 during an exemplary copper coating deposition phase 208, in which a thermal spray device 350 is spraying a jet 352 comprising particles of copper over a portion of the surface of the water barrier 120 at the welded joint 320, to depose a copper coating 354 according to an embodiment of the present invention.

The thermal spray device 350 comprises a chamber 360 where copper is provided in form of powder, for example, depending on the specific thermal spray process employed. In chamber 360 the particles of copper are molten, if the specific thermal spray process requires, and accelerated. A feeder 365 is coupled to the chamber 360 for supplying the copper powder. A supply unit 370 is further coupled to the chamber 360 for providing gases and/or liquids for the generation of flame/plasma jets and/or gas jets carrying the particles to be accelerated. The chamber 360 is further coupled to a nozzle 375 adapted to control the direction and the velocity of the jet carrying the particles of copper exiting the chamber 360 toward the surface of the water barrier 120.

With the above described method, it is possible to depose over selected portions of the surface of the water barrier 120 a thin copper coating 354 capable of eliminating the drawbacks caused by the presence of defects at the welded joint 320.

In order to improve the adhesion between the copper particles in the jet 352 and the surface of the welded joint 320, the method 200 can provide a surface preparation phase 210 before the copper coating deposition phase 208. The surface preparation phase 210 provides for roughening the surface of the welded joint 320 in such a way to favor the mechanical bond between the melted particles sprayed by the thermal spray device 350 and the surface of the barrier sheath 120 itself. The surface roughening step is advantageous when the thermal spray process employed is a flame spray process.

For example, the surface preparation phase 210 provides for propelling under high pressure a stream of abrasive material, such as sand, against the surface of the water barrier 120 (sandblasting procedure). Advantageously, the surface preparation phase 210 also causes oxides and impurities to be removed from the surface of the water barrier 120.

Following the welding and thermal spraying of the water barrier 120 around core layers 115, the manufacturing of a cable as from, for example, FIGS. 1A and 1B, provides for joining three cores 105, optionally by a binder tape (not illustrated) and stranding them together in a conventional manner, for example with a SZ-lay-up.

The stranding of the cores 105 gives rise to formation of interstitial zones which are filled with filler 125. For example, as filler 145 polypropylene yarns or raffia-like strands can be employed. These materials allow filling the hollow space without adding excessive weight to the cable.

A tape 130 is wound around the filler 145, then a bedding layer 135 made, for example, of polyethylene is extruded around the tape 130. Alternatively, the bedding layer 135 can be in form of fabric tapes. The function of the bedding layer 135 is of cushioning the underlying layers from undue located press from the armoring wires 145.

The wires 145 are helically wound around the bedding layer 135 to provide the armour layer 140. The wires 145 can be made of ferromagnetic material such as carbon steel, construction steel, ferritic stainless steel, or of amagnetic stainless steel.

The armour layer 140 is finally surrounded by an external sheath 150.

The same manufacturing procedure is applied, mutatis mutandis, to a single-core cable where the tape 130 is applied directly onto the copper water barrier.

In the case of underground cables, the provision of an armour layer and, accordingly, of a bedding layer is not requested. An external layer of polyethylene is extruded directly onto the tape surrounding the filler or, in the case the cable is a single core cable, onto the copper water barrier.

Although in the present description reference has been made to a method for manufacturing a cable comprising steps directed to manufacture a water barrier to be arranged around each core of the cable, similar considerations apply if the method described above is used to manufacture a water barrier adapted to be arranged around the filler to surround all the cores of the cable. Mixed solutions are also contemplated, in which the cable is provided with a water barrier for each core, and at the same time with a common water barrier surrounding the polymeric filler, the tape or the bedding layer which surround all the cores of the cable.

EXAMPLE 1

Juxtaposed rims of two copper sheaths about 40 cm long and 0.5 mm thick were welded one another by TIG technique. A micrograph taken at the welded joint showed irregularities on the surface, possibly constituting weak points. Two samples were obtained by cutting the welded sheaths perpendicularly to the joint. The welded joint of one sample was roughened by sand-blasting, then a copper layer 100 µm-thick was deposed on the welded joints of both the sample by HVOF technique using copper particles of 10-80 µm. Micrographs were taken of the copper coated welded joints of both the samples and both the surfaces appeared smooth and substantially free from irregularities. Porosity was measured by a microscope to be of about 0.5% in both the samples.

A metallographic analysis of the samples showed that the copper coating sprayed onto the sandblasted joint adhered evenly thereto (no significant voids were visible in the cross-section); while an evident discontinuity was present between the copper coating and the non-roughened welded joint sample. Such a discontinuity could give place to copper coating detachment during the further manufacturing step or operation of the cable.

EXAMPLE 2

In two copper tubes (about 40 cm long and 0.5 mm thick) obtained by welding copper sheaths by TIG micro-defects were created. In particular, in sample A and B one hole was made through each respective welded joint by a high speed screwdriver, the hole having a diameter of 0.213 mm and 0.331 mm, respectively.

After sand-blasting, a copper coating 150 µm thick was deposed by HVOF on the welded joints of both the three samples. Micrographs taken after the copper spraying showed that the formed micro-defects disappeared.

The two repaired samples were then submitted to pressure tests. Two flanges were applied at the end of each tube A and B. The flanges had an inner diameter slightly greater than the tube diameter, a tie-rod in the centre and a retaining O-ring for airtighting. One flange per tube had one charge valve and one discharge valve. Each sample was immersed into water and kept under pressure as follows: 1 hour at 2 bars, 1 hour at 4 bars, and 2 hours at 8 bars. During the whole test period no air leakage was observed in any of the samples, showing that a defective welded joint can be successfully made reliable even under harsh pressure conditions by the copper spraying process according to the invention.

The invention claimed is:

1. A method for manufacturing a power cable comprising:
providing at least one core comprising an electrical conductor;
arranging at least one copper sheath around the at least one core, said arranging the copper sheath comprising:
providing at least one copper foil having two opposite first edges;
bending the copper foil around the core until the first edges of the copper foil are contacted to each other;
welding the first edges of the copper foil to each other to form a corresponding welded joint; and
deposing a copper coating on the copper foil and the welded joint, wherein said deposing the copper coating is carried out by a thermal spray process.

2. The method of claim 1, wherein said deposing the copper coating is carried out by a thermal spray process selected from flame spray and cold spray processes.

3. The method of claim 2, wherein the flame spray process is selected from flame powder spray and high-velocity oxyfuel spray.

4. The method of claim 3, further comprising, after welding the first edges and before deposing the copper coating:
roughening copper foil at substantially the welded joint.

5. The method of claim 4, wherein said roughening comprises:
propelling a stream of abrasive material against the surface of the foil of copper at the welded joint.

6. The method of claim 2, wherein said deposing the copper coating is carried out by cold spray process.

7. The method of claim 1, wherein the cable is a multi-core cable comprising a plurality of cores, said arranging at least one copper sheath around the at least one core comprising:
arranging a respective copper sheath around each core.

8. The method of claim 1, wherein deposing a copper coating provides a copper coating having a thickness of from 100 µm to 500 µm.

9. The method of claim 1, wherein deposing a copper coating provides a copper coating having a thickness of from 150 µm to 300 µm.

10. A power cable comprising:
at least one core comprising an electrical conductor;
at least one copper sheath surrounding the at least one core, the copper sheath having a welded joint; and
a thermal sprayed copper coating on at least the welded joint.

11. The power cable of claim 10, wherein said cable is an underwater cable.

12. The power cable of claim 10, wherein said cable is an underground cable.

* * * * *